United States Patent
Wang et al.

(10) Patent No.: US 7,522,808 B2
(45) Date of Patent: Apr. 21, 2009

(54) VARIABLE OPTICAL ATTENUATOR

(75) Inventors: Zeqin Wang, Shenzhen (CN); Hong Xie, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 0 days.

(21) Appl. No.: 12/062,589

(22) Filed: Apr. 4, 2008

(65) Prior Publication Data

US 2008/0253731 A1 Oct. 16, 2008

(30) Foreign Application Priority Data

Apr. 4, 2007 (CN) .................. 2007 2 0119293

(51) Int. Cl.
*G02B 6/00* (2006.01)
(52) U.S. Cl. .................. 385/140; 385/31; 385/14; 385/33
(58) Field of Classification Search .................. 385/140, 385/14, 24, 31, 33, 34, 47
See application file for complete search history.

(56) References Cited

U.S. PATENT DOCUMENTS

| | | | |
|---|---|---|---|
| 5,087,122 A * | 2/1992 | Ostrander et al. .......... 356/73.1 |
| 6,292,616 B1 * | 9/2001 | Tei et al. .................. 385/140 |
| 6,529,673 B1 * | 3/2003 | Liu et al. .................. 385/140 |
| 6,625,377 B2 * | 9/2003 | Chang .................. 385/140 |
| 6,937,809 B1 * | 8/2005 | Zhang .................. 385/140 |
| 2008/0253731 A1 * | 10/2008 | Wang et al. .................. 385/140 |

* cited by examiner

*Primary Examiner*—Brian M Healy
(74) *Attorney, Agent, or Firm*—Morris Manning Martin LLP; Tim Tingkang Xia, Esq.

(57) ABSTRACT

A variable optical attenuator with photoelectric detector, comprising a collimator, a variable optical attenuator chip, wherein the variable optical attenuator further comprises a photoelectric detector; and the photoelectric detector receives and detects partial light from the variable optical attenuator chip. The variable optical attenuator of the invention is capable of detecting attenuation change of itself via the variable optical attenuator chip. Thus, real-time monitoring and feedback are implemented, and the attenuation performance of the variable optical attenuator is improved.

10 Claims, 6 Drawing Sheets

VARIABLE OPTICAL ATTENUATOR

CROSS-REFERENCE TO RELATED APPLICATIONS

This application claims priority benefits to Chinese Patent Application No. 200720119293.0 filed on Apr. 4, 2007, the contents of which are incorporated herein by reference.

BACKGROUND OF THE INVENTION

1. Field of the Invention

The invention relates to optical components, and particularly to a variable optical attenuator with a photoelectric detector.

2. Description of the Related Art

Telecommunication and data transfers over networks are increasingly being implemented using optical components. To enable the power of an optical beam to be reduced in a controlled manner, various types of variable optical attenuators (VOA) have been developed. Amongst these, a micro-electro-mechanical system (MEMS)-type attenuator is commonly-used. The MEMS optical attenuator comprises a pair of collimators and a MEMS driving shade. Since mode field diameters vary depending on the wavelength, this kind of MEMS optical attenuator may have large wavelength-dependent losses.

FIG. 1 illustrates another type of MEMS optical attenuator, comprising an optical fiber holder 101 which holds optical fibers 1011 and 1012, a lens 103 and a mirror 104. As the mirror 104 rotates, the light entering the optical fiber 1012 is changed.

However, the above-mentioned MEMS optical attenuators are not capable of detecting their own attenuation performance, and therefore their reliability cannot be guaranteed.

SUMMARY OF THE INVENTION

In view of the above-described problems, it is one objective of the invention to provide a variable optical attenuator that is capable of detecting its own attenuation performance and thus integrating more function in one device.

To achieve the above objectives, in accordance with one embodiment of the invention, provided is a variable optical attenuator, comprising a collimator, a variable optical attenuator chip, wherein the variable optical attenuator further comprises a photoelectric detector; and the photoelectric detector receives and senses light beam from the variable optical attenuator chip.

In certain classes of this embodiment, the collimator comprises an optical fiber holder and a lens.

In certain classes of this embodiment, the optical fiber holder holds two optical fibers.

In certain classes of this embodiment, the optical fiber holder holds one optical fiber.

In certain classes of this embodiment, the photoelectric detector is a photodiode.

The variable optical attenuator of the invention is capable of detecting attenuation change of itself via the variable optical attenuator chip. Thus, real-time monitoring and feedback are implemented, and attenuation performance of the variable optical attenuator is improved.

DETAILED DESCRIPTION OF THE EMBODIMENTS

Detailed description will be given in the examples below with reference to accompanying drawings.

EXAMPLE 1

Figure 1:
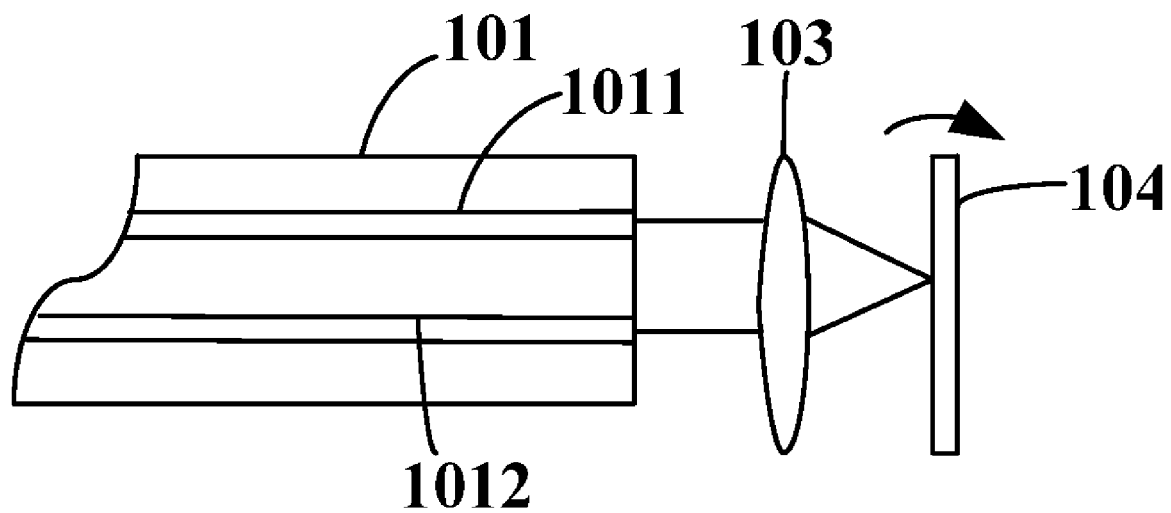
FIG. 1 illustrates a variable optical attenuator of the prior art.
Figure 2:
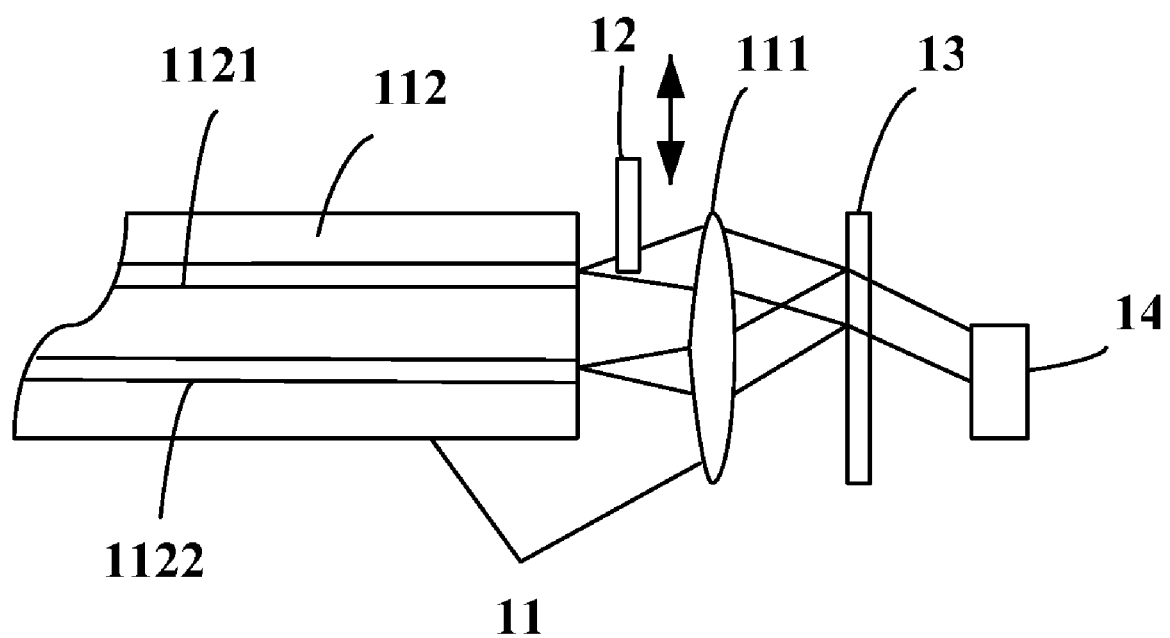
FIG. 2 illustrates a variable optical attenuator of a first embodiment of the invention.

As shown in FIG. 2, a variable optical attenuator of a first embodiment of the invention comprises a collimator 11, a variable optical attenuator chip 12, an optical filter 13, and a photoelectric detector 14. The collimator 11 comprises a lens 111 and an optical fiber holder 112. The variable optical attenuator chip 12 is disposed between the lens 111 and the optical fiber holder 112. The optical fiber holder 112 comprises a first optical fiber 1121 and a second optical fiber 1122. The optical filter 13 is disposed at the front end of the lens 111, and operates to split light. Part of light is transmitted by the optical filter 13 and then received by the photoelectric detector 14. In this embodiment, the photoelectric detector 14 is a photodiode.

In the first embodiment of the invention, light exiting the first optical fiber 1121 of the optical fiber holder 112 is attenuated by the variable optical attenuator chip 12, and then reaches the optical filter 13 via the lens 111. Most of the light is reflected by the optical filter 13 and focused onto the second optical fiber 1122 of the optical fiber holder 112, and the rest of the light is transmitted to the photoelectric detector 14 by the optical filter 13. Thus, as the variable optical attenuator chip 12 operates, the photoelectric detector 14 is capable of detecting attenuation change of the variable optical attenuator, and real-time monitoring and feedback are implemented.

EXAMPLE 2

Figure 3:
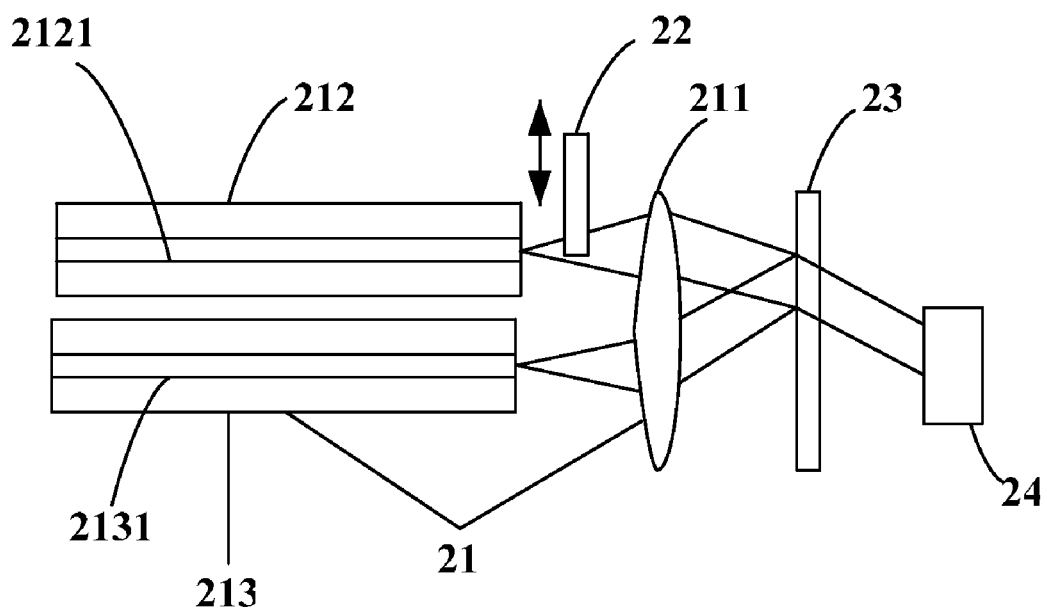
FIG. 3 illustrates a variable optical attenuator of a second embodiment of the invention.

As shown in FIG. 3, the variable optical attenuator of a second embodiment of the invention comprises a collimator 21, a variable optical attenuator chip 22, an optical filter 23, and a photoelectric detector 24. The collimator 21 comprises a lens 211, a first optical fiber holder 212 and a second optical fiber holder 213. The variable optical attenuator chip 22 is disposed between the lens 211 and either the first optical fiber holder 212 or the second optical fiber holder 213. The optical filter 23 is disposed at the front end of the lens 211, and operates to split light. Part of light is transmitted by the optical filter 23 and then received by the photoelectric detector 24. In this embodiment, the photoelectric detector 24 is a photodiode.

In the second embodiment of the invention, light exiting the first optical fiber 2121 of the first optical fiber holder 212 is attenuated by the variable optical attenuator chip 22, and then transmitted to the optical filter 23 via the lens 211. Most of the light is reflected by the optical filter 23, and then focused onto the second optical fiber 2131 of the second optical fiber holder 213, and the rest of the light is transmitted to the photoelectric detector 24 via the optical filter 23. Thus, as the variable optical attenuator chip 22 operates, the photoelectric detector 24 is capable of detecting attenuation change of the variable optical attenuator, and real-time monitoring and feedback are implemented.

EXAMPLE 3

Figure 4:
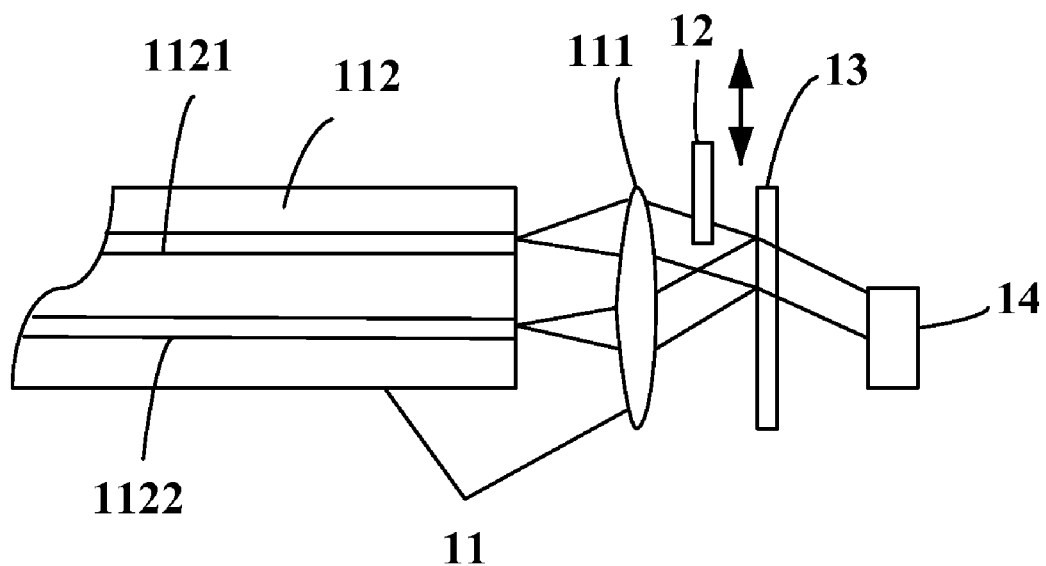
FIG. 4 illustrates a variable optical attenuator of a third embodiment of the invention.

As shown in FIG. 4, the variable optical attenuator of a third embodiment of the invention comprises a collimator 11, a variable optical attenuator chip 12, an optical filter 13, and a photoelectric detector 14. The collimator 11 comprises a lens 111 and an optical fiber holder 112. The variable optical attenuator chip 12 is disposed between the lens 111 and the optical filter 13. The optical filter 13 is disposed at the front end of the lens 111, and operates to split light. Part of light is transmitted by the optical filter 13 and received by the photoelectric detector 14. In this embodiment, the photoelectric detector 14 is a photodiode.

In the third embodiment of the invention, light exiting the first optical fiber 1121 of the optical fiber holder 112 is transmitted via the lens 111, attenuated by the variable optical attenuator chip 12, passed onto the optical filter 13. Most of the light is reflected by the optical filter 13, and then focused onto the second optical fiber 1121 of the optical fiber holder 112, and the rest of the light is transmitted to the photoelectric detector 14 by the optical filter 13. Thus, as the variable optical attenuator chip 12 operates, the photoelectric detector 14 is capable of detecting attenuation change of the variable optical attenuator, and real-time monitoring and feedback are implemented.

EXAMPLE 4

Figure 5:
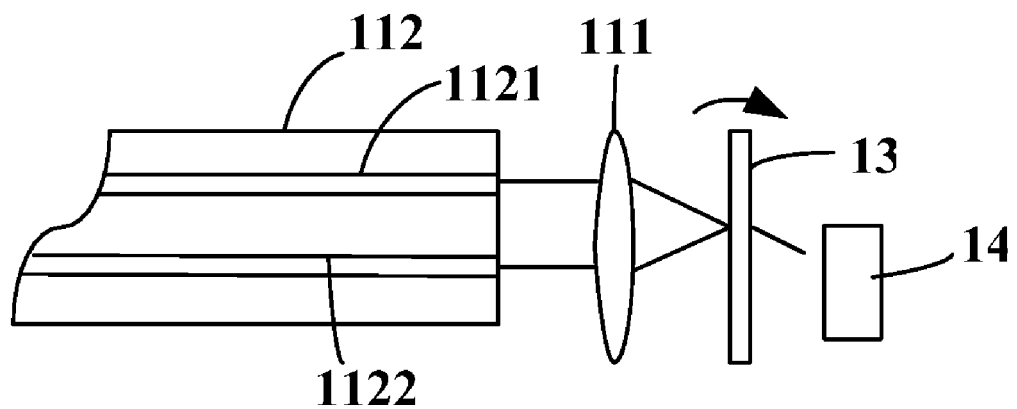
FIG. 5 illustrates a variable optical attenuator of a fourth embodiment of the invention.

As shown in FIG. 5, a variable optical attenuator of a fourth embodiment of the invention comprises a collimator, an optical filter 13, and a photoelectric detector 14. The collimator comprises a lens 111 and an optical fiber holder 112. The optical filter 13 is disposed at a front end of the lens 111, and operates to split light. Part of light is transmitted by the optical filter 13 and then received by the photoelectric detector 14. In this embodiment, the photoelectric detector 14 is a photodiode, and the optical filter 13 is a rotable optical filter.

In the fourth embodiment of the invention, light exiting the lens 111 via the first optical fiber 1121 of the optical fiber holder 112 is attenuated by the optical filter 13. Most of the light is reflected by the optical filter 13, and then focused onto the second optical fiber 1122 of the optical fiber holder 112, and the rest of the light is transmitted to the photoelectric detector 14 via the optical filter 13. Thus, the photoelectric detector 14 is capable of detecting attenuation change of the variable optical attenuator, and real-time monitoring and feedback are implemented.

EXAMPLE 5

Figure 6:
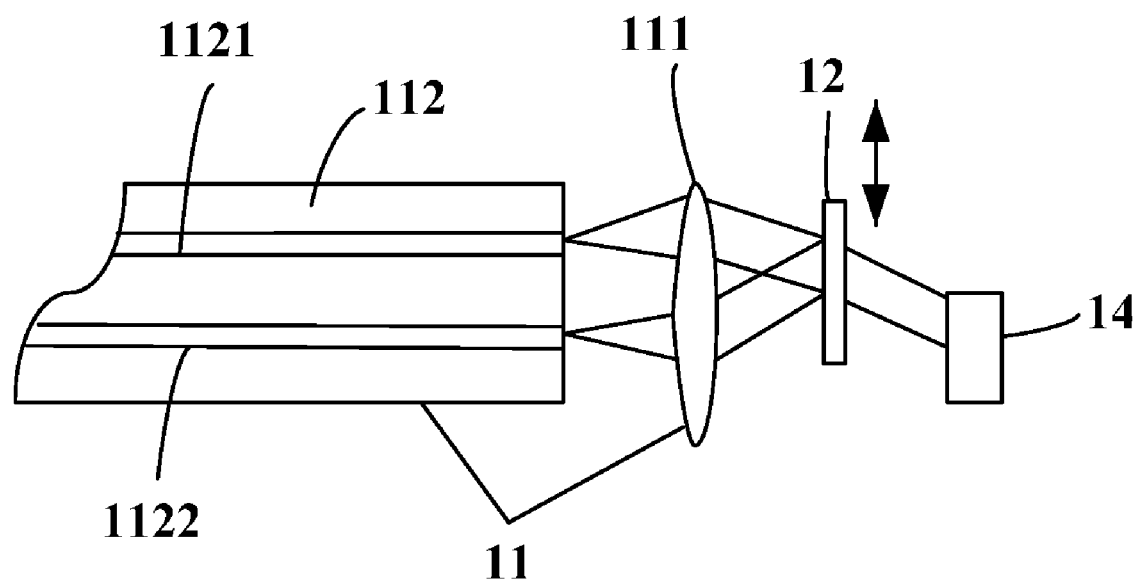
FIG. 6 illustrates a variable optical attenuator of a fifth embodiment of the invention.

As shown in FIG. 6, a variable optical attenuator of a fifth embodiment of the invention comprises a collimator 11, a variable optical attenuator chip 12 and a photoelectric detector 14. The collimator 11 comprises a lens 111 and an optical fiber holder 112. The variable optical attenuator chip 12 is disposed at a front end of the lens of the lens 111, and operates to split light. Part of light is transmitted by the variable optical attenuator chip 12 and then received by the photoelectric detector 14. In this embodiment, the photoelectric detector 14 is a photodiode.

In the fifth embodiment of the invention, light exiting the lens 111 via the first optical fiber 1121 of the optical fiber holder 112 is attenuated by the variable optical attenuator chip 12. Most of the light is reflected by the variable optical attenuator chip 12, and then focused onto the second optical fiber 1122 of the optical fiber holder 112, and the rest of the light is transmitted to the photoelectric detector 14 via the variable optical attenuator chip 12. Thus, as the variable optical attenuator chip 22 operates, the photoelectric detector 14 is capable of detecting attenuation change of the variable optical attenuator, and real-time monitoring and feedback are implemented.

The variable optical attenuator of the invention detects its own attenuation change via the variable optical attenuator chip. Thus, real-time monitoring and feedback are implemented, and the attenuation performance of the variable optical attenuator is improved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What claimed is:

1. A variable optical attenuator, comprising:
   a collimator comprising a lens and an optical fiber holder at least with a first optical fiber and a second optical fiber;
   a variable optical attenuator chip;
   an optical filter; and
   a photoelectric detector;
   wherein
   said variable optical attenuator chip attenuates light exiting from said first optical fiber;
   said photoelectric detector detects amount of attenuation delivered by said variable optical attenuator chip;
   said variable optical attenuator chip is disposed between said first optical fiber and said lens; and
   said lens is disposed between said variable optical attenuator chip and said optical filter.

2. The attenuator of claim 1, wherein the photoelectric detector is a photodiode.

3. The attenuator of claim 1, wherein light exiting from said first optical fiber passes first through said variable optical attenuator chip, then passes though said lens, then is partially transmitted and partially reflected by said optical filter, a reflected portion of the light passes though said lens and is focused on said second optical fiber, and a transmitted portion of the light is detected by said photoelectric detector.

4. A variable optical attenuator, comprising:
   a collimator comprising a lens, a first optical fiber holder with a first optical fiber, and a second optical fiber holder with a second optical fiber;
   a variable optical attenuator chip;
   an optical filter; and
   a photoelectric detector;
   wherein
   said variable optical attenuator chip attenuates light exiting from said first optical fiber;
   said photoelectric detector detects amount of attenuation delivered by said variable optical attenuator chip;
   (i) said variable optical attenuator chip is disposed between said first optical fiber and said lens; and said lens is disposed between said variable optical attenuator chip and said optical filter; or
   (ii) said variable optical attenuator chip is disposed between said lens and said optical filter; and said optical filter is disposed between said variable optical attenuator chip and said photoelectric detector.

5. The attenuator of claim 4, wherein light exiting from said first optical fiber passes first through said variable optical attenuator chip, then passes though said lens, then is partially transmitted and partially reflected by said optical filter, a reflected portion of the light passes though said lens and is focused on said second optical fiber, and a transmitted portion of the light is detected by said photoelectric detector.

6. The attenuator of claim 4, wherein the photoelectric detector is a photodiode.

7. A variable optical attenuator, comprising:
   a collimator comprising a lens and an optical fiber holder at least with a first optical fiber and a second optical fiber;
   a variable optical attenuator chip;
   an optical filter; and
   a photoelectric detector;
wherein
   said variable optical attenuator chip attenuates light exiting from said first optical fiber;
   said photoelectric detector detects amount of attenuation delivered by said variable optical attenuator chip;
   said variable optical attenuator chip is disposed between and said lens and said optical filter; and
   said optical filter is disposed between said variable optical attenuator chip and said photoelectric detector.

8. The attenuator of claim 7, wherein the photoelectric detector is a photodiode.

9. A variable optical attenuator, consisting essentially of:
   a collimator consisting of a lens and an optical fiber holder a first optical fiber and a second optical fiber;
   a variable optical attenuator chip; and
   a photoelectric detector;
wherein
   said variable optical attenuator chip attenuates light exiting from said first optical fiber, transmits a first portion of the light towards said photoelectric detector, and reflects a second portion of the light towards said lens and said second optical fiber;
   said photoelectric detector detects amount of attenuation delivered by said variable optical attenuator chip;
   said variable optical attenuator chip is disposed between said lens and said photoelectric detector.

10. The attenuator of claim 9, wherein the photoelectric detector is a photodiode.

\* \* \* \* \*